(12) United States Patent
Grubbs et al.

(10) Patent No.: US 8,200,722 B2
(45) Date of Patent: *Jun. 12, 2012

(54) METHOD FOR SHRINKING A FILE SYSTEM

(75) Inventors: Mark Allen Grubbs, Round Rock, TX (US); Gunisha Madan, Austin, TX (US); Gerald Francis McBrearty, Austin, TX (US); Grover Herbert Neuman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 182 days.

This patent is subject to a terminal disclaimer.

(21) Appl. No.: 12/498,694

(22) Filed: Jul. 7, 2009

(65) Prior Publication Data

US 2009/0265401 A1 Oct. 22, 2009

Related U.S. Application Data

(63) Continuation of application No. 11/334,674, filed on Jan. 18, 2006, now Pat. No. 7,587,573.

(51) Int. Cl.
*G06F 12/00* (2006.01)
*G06F 17/30* (2006.01)

(52) U.S. Cl. ...................................... 707/822

(58) Field of Classification Search ......................... None
See application file for complete search history.

(56) References Cited

U.S. PATENT DOCUMENTS

| 5,706,472 A | 1/1998 | Ruff et al. |
|---|---|---|
| 5,761,680 A * | 6/1998 | Cohen et al. ........................... 1/1 |
| 6,108,759 A | 8/2000 | Orcutt et al. |
| 6,253,300 B1 | 6/2001 | Lawrence et al. |
| 6,829,688 B2 | 12/2004 | Grubbs et al. |
| 2005/0081099 A1 | 4/2005 | Chang et al. |
| 2005/0182771 A1 | 8/2005 | Grubbs et al. |

OTHER PUBLICATIONS

Kay, "Disk Defragmenters Demystified", HTML, Oct. 24, 2005, Computerworld; http://www.computerworld.com/action/article/article.do?command=viewArticleBasic&articleId=105582, retrieved on Apr. 20, 2009.
Froehlich, Using Windows 2000 Disk Defragmenter Utility, Aug. 2000, Microsoft Developer Network, http://msdn.microsoft.com/archive/default.asp?url=/archive/en-us/dnarntpro00/html/ntp0083.asp.

* cited by examiner

*Primary Examiner* — Pierre Vital
*Assistant Examiner* — Jason Liao
(74) *Attorney, Agent, or Firm* — Yee & Associates, P.C.; Matthew W. Baca

(57) ABSTRACT

Illustrative embodiments disclose shrinking a file system in a data processing system by designating an amount by which the file system stored in a memory and comprised of a plurality of contiguous logical blocks is to be shrunk. At least one contiguous intermediate logical block of the plurality of contiguous logical blocks from the file system is removed to shrink the file system by the designated amount. A record is maintained indicating a first intermediate logical block of the at least one contiguous intermediate logical block at which the removing starts, and a last intermediate logical block of the at least one contiguous intermediate logical block at which the removing ends.

8 Claims, 5 Drawing Sheets

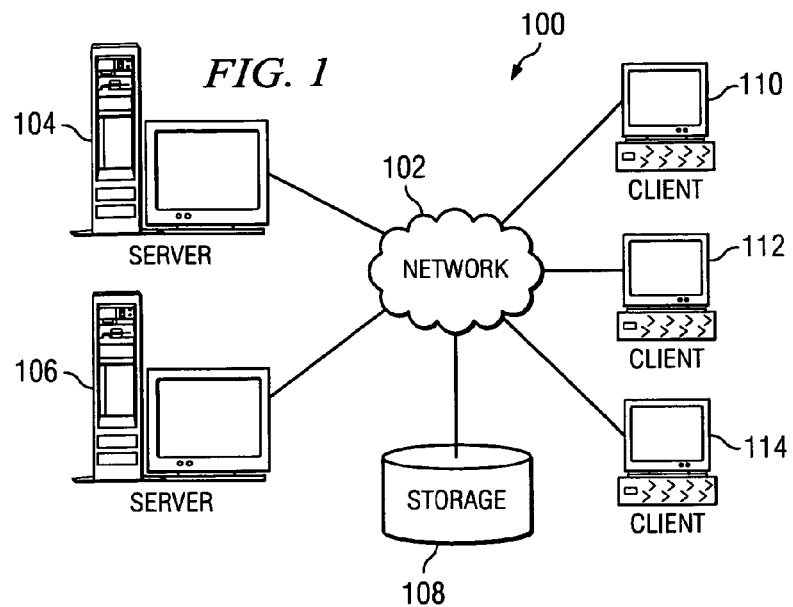

FIG. 5
*(PRIOR ART)*
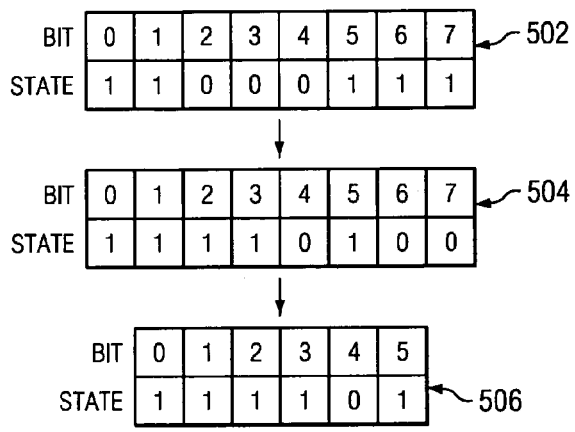
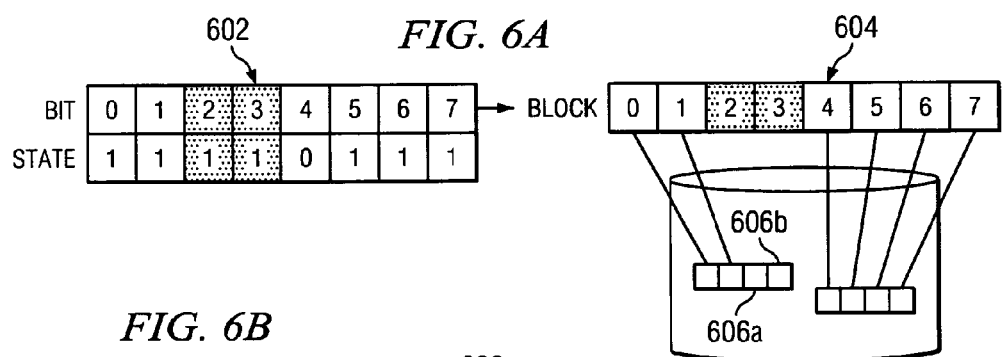
FIG. 6A
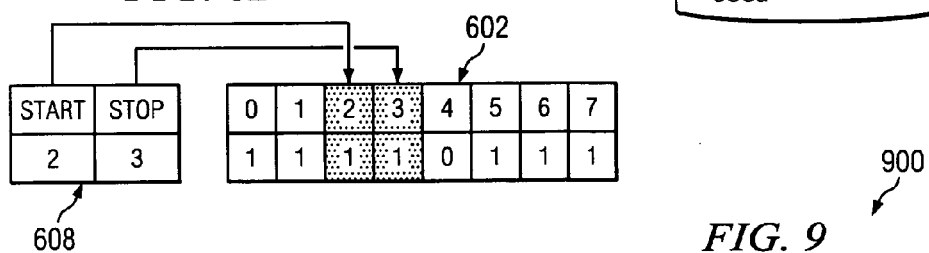
FIG. 6B
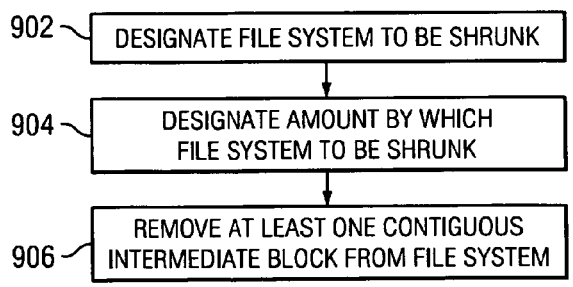
FIG. 9

METHOD FOR SHRINKING A FILE SYSTEM

This application is a continuation of application Ser. No. 11/334,674, filed Jan. 18, 2006, status allowed.

BACKGROUND OF THE INVENTION

1. Field of the Invention

The present invention relates generally to the data processing field and, more particularly, to a computer implemented method, system and computer program product for shrinking a file system in a data processing system.

2. Description of the Related Art

Shrinking of a file system in a data processing system is currently performed at the end of the file system. Thus, if files are located at the end of a file system, it is necessary to first move those files to another location toward the front of the file system in order to free up the space at the end of the file system, and then truncate the file system. Particularly in file systems that contain large amounts of data, this process can be inefficient and time consuming; and, potentially, also require the movement of metadata as well as user data.

Consider, for example, that the middle third of a file system is empty and the other two thirds of the file system are full. With current procedures for shrinking a file system, the allocations in the last third of the file system have to be moved to the empty middle third before the file system can be shrunk. In a 12 TB file system, it would be necessary to move 4 TB of data in order to shrink the file system.

It would, accordingly, be desirable to provide a mechanism for shrinking a file system in a data processing system that does not require movement of data from one location to another location in the file system.

SUMMARY OF THE INVENTION

Embodiments of the inventions disclose shrinking a file system in a data processing system by designating an amount by which the file system stored in a memory and comprised of a plurality of contiguous logical blocks is to be shrunk. At least one contiguous intermediate logical block of the plurality of contiguous logical blocks from the file system is removed to shrink the file system by the designated amount. A record is maintained indicating a first intermediate logical block of the at least one contiguous intermediate logical block at which the removing starts, and a last intermediate logical block of the at least one contiguous intermediate logical block at which the removing ends.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

FIG. 1 depicts a pictorial representation of a network of data processing systems in which aspects of the present invention may be implemented;

FIG. 2 depicts a block diagram of a data processing system in which aspects of the present invention may be implemented;

FIG. 5 is a diagram that schematically illustrates a known method for shrinking a file system in a data processing system to assist in understanding exemplary embodiments of the present invention;

FIGS. 6A and 6B are diagrams that schematically illustrate a method for shrinking a file system in a data processing system according to an exemplary embodiment of the present invention;

FIG. 9 is a flowchart that illustrates a method for shrinking a file system in a data processing system according to an exemplary embodiment of the present invention.

DETAILED DESCRIPTION OF THE PREFERRED EMBODIMENT

Figure 3:
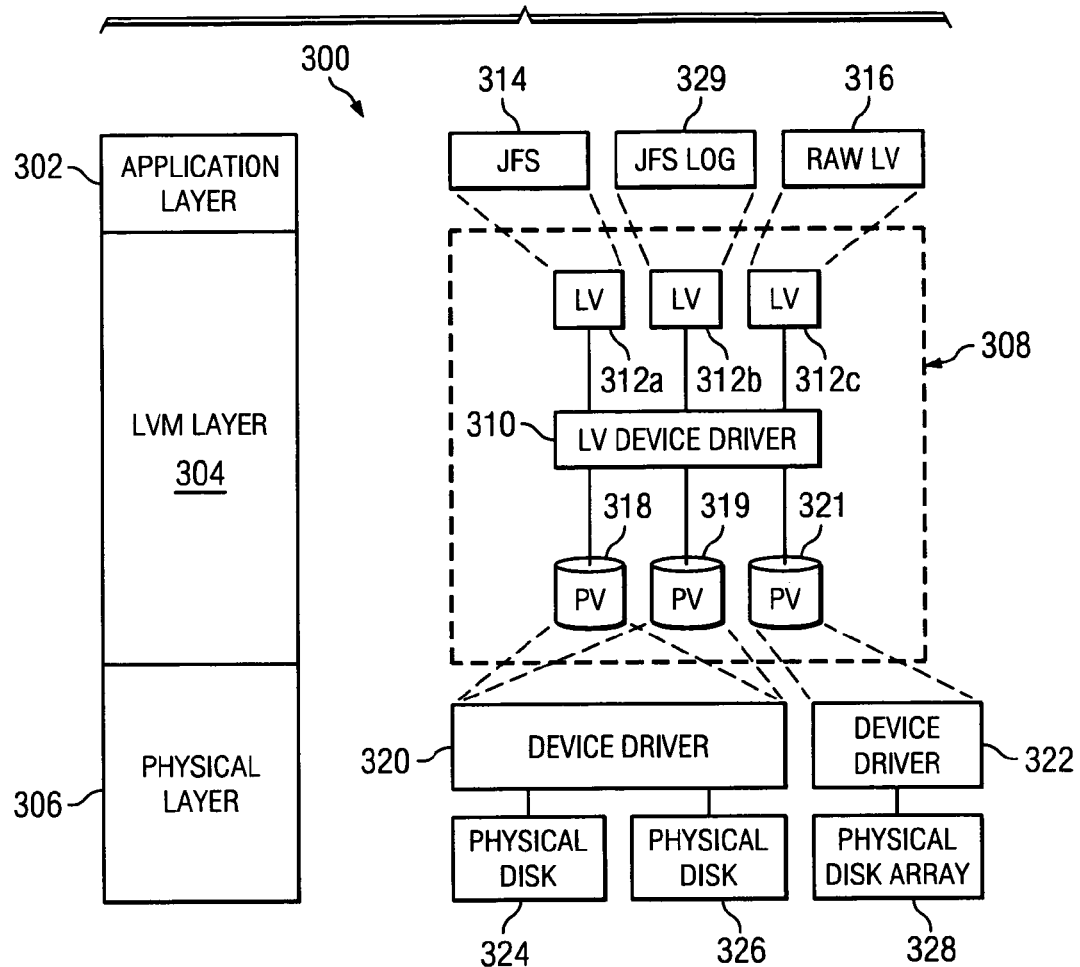
FIG. 3 depicts a logical volume management data storage subsystem in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The AIX® operating system referred to above includes a logical volume manager (LVM) that enables online disk storage management by adding a virtualization layer between the physical disks and applications users of the disk space such as a file system. A volume manager virtual device, referred to herein as a logical volume, maps a contiguous logical address space to a physical disk address space that may be contiguous or discontinuous.

An LVM, such as AIX LVM, uses a hierarchy of structures to manage fixed-disk storage. Each individual fixed-disk drive is called a physical volume (PV), and every physical volume in use belongs to a volume group (VG). All of the physical volumes in a volume group are divided into physical blocks of the same size. The number of physical blocks on each disk varies with the total capacity of the disk drive.

Within each volume group, one or more logical volumes are defined. Logical volumes are groups of information located on physical volumes. Data on logical volumes appears to be contiguous to the user but can be discontiguous on the physical volume. This allows file systems, paging space, and other logical volumes to be resized or relocated, span multiple physical volumes, and have their contents replicated for greater flexibility and availability in the storage of data. Logical volumes can serve a number of system purposes, such as paging, raw data, or contain a single file system.

Each logical volume comprises one or more logical blocks. Each logical block corresponds with and is mapped to at least one physical block. If mirroring is specified for the logical volume, additional physical blocks are allocated to store the additional copies of each logical block. Although the logical blocks are numbered consecutively, as indicated above, the underlying physical blocks are not necessarily consecutive or contiguous.

In general, logical volumes present a simple contiguous view of data storage to an application/user while hiding the more complex and possibly non-contiguous physical arrangement of the data.

FIG. 3 depicts a logical volume management data storage subsystem in which aspects of the present invention may be implemented. The data storage subsystem is generally designated by reference number 300, and may be implemented as a subsystem of data processing system 200 illustrated in FIG. 2. Logical volume management data storage subsystem 300 contains logical layer (LVM layer) 304 that controls and coordinates disk resources by mapping data between a simple and flexible logical view of storage space within designated volume group 308 and the physical disk media within disk drives 324 and 326 and Redundant Array of Independent Disks (RAID) 328. LVM layer 304 does this by using a layer of device driver code, depicted in FIG. 3 as logical volume device driver (LVDD) 310, that runs above traditional physical device drivers, represented in FIG. 3 as device driver 320 and RAID adapter 322. Disk drives 324 and 326, and the collective drives within RAID 328 are each designated within LVM layer 304 as a physical volume. In subsystem 300, disk drives 324 and 326 are physically represented in LVM layer 304 as physical volumes 318 and 319, respectively, while the multiple disk drives within RAID 328 are represented as physical volume 321.

Volume group 308 includes a file system which provides a complete directory structure, including a root directory and any subdirectories and files beneath the root directory. Some of the most important volume group management tasks are facilitated by management of the resident file system. Specifically, file system management tasks include: allocating space for file systems on logical volumes; creating file systems; making file system space available to system users; monitoring file system space usage; maintaining file systems in a consistent state; and backing up file systems to guard against data loss in the event of a system failure.

Often, the native file system type employed in a volume group storage environment such as data storage subsystem 300 is called a journaled file system (JFS). A JFS utilizes database journaling techniques to maintain its structural consistency, preventing damage to the file system when the system is halted abnormally. A JFS thus enhances the backup data reliability of the overall system. In subsystem 300 depicted in FIG. 3, logical volumes 312a and 312c, provide a logical view of the data storage resources to an application layer JFS 314 and a raw logical volume application 316 within application layer 302. This logical view of data storage resources is independent of the underlying physical disk structure as characterized within physical layer 306. In addition to providing an organized structure of files and directories for data resources within volume group 308, JFS 314 includes additional elements to facilitate efficient access to the data resources, including a superblock (not depicted) that maintains information about the entire file system including the size of the file system, the number of data blocks in the file system, allocation group sizes, and a flag that indicates the state of the file system.

JFS 314 uses a database journaling technique to maintain a consistent file system structure. This journaling technique includes duplicating transactions involving changes to file system metadata to a JFS log 329 that is maintained as specialized logical volume 312b. JFS log 329 is utilized as a circular journal for recording modifications to the file system metadata. Such file system metadata may include a superblock containing global file system information, i-nodes containing file access information, indirect data pointers, and directories. When metadata is modified in the course of application layer processing, a duplicate transaction is recorded in the JFS log.

The present invention provides a mechanism for shrinking a file system, for example, the file system included in volume group 308 depicted in FIG. 3. Shrinking of a file system may be desirable to free up physical storage that is not being used, for example, as a result of a change in the requirements of the file system and for other reasons.

Figure 4A:
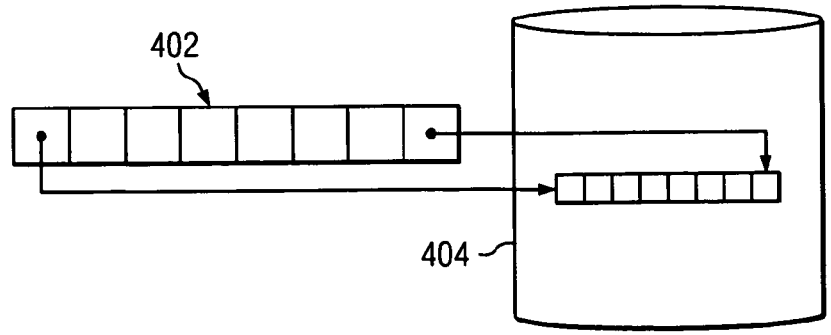
FIGS. 4A-4D are block diagrams that schematically illustrate mapping between logical blocks of a logical volume and physical blocks of a physical volume in a logical volume management data storage subsystem to assist in understanding exemplary embodiments of the present invention.
Figure 4B:
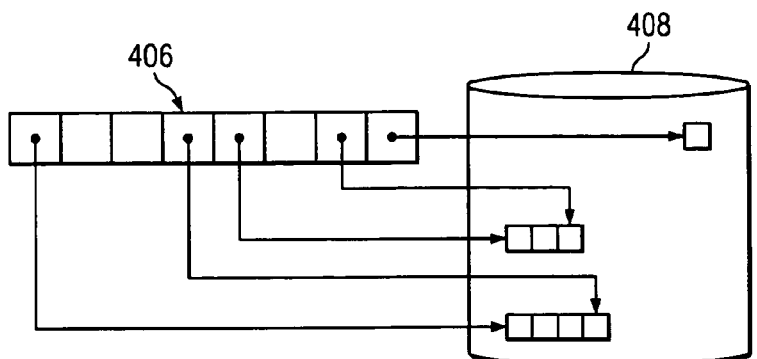

FIGS. 4A-4D are block diagrams that schematically illustrate mapping between logical blocks of a logical volume and physical blocks of a physical volume in a logical volume management data storage subsystem, such as logical volume management data storage subsystem 300 illustrated in FIG. 3, to assist in understanding exemplary embodiments of the present invention. FIG. 4A illustrates mapping from logical volume 402 to physical volume 404. Logical volume 402 contains eight blocks, and physical volume 404 contains more than eight blocks. The blocks in logical volume 402 are always contiguous and, in the example illustrated in FIG. 4A, map to a subset of blocks of physical volume 404 which are also contiguous. As shown in FIG. 4B, however, which shows mapping from logical volume 406 to a subset of blocks of physical volume 408, the blocks of a physical volume need not always be contiguous.

Figure 4C:
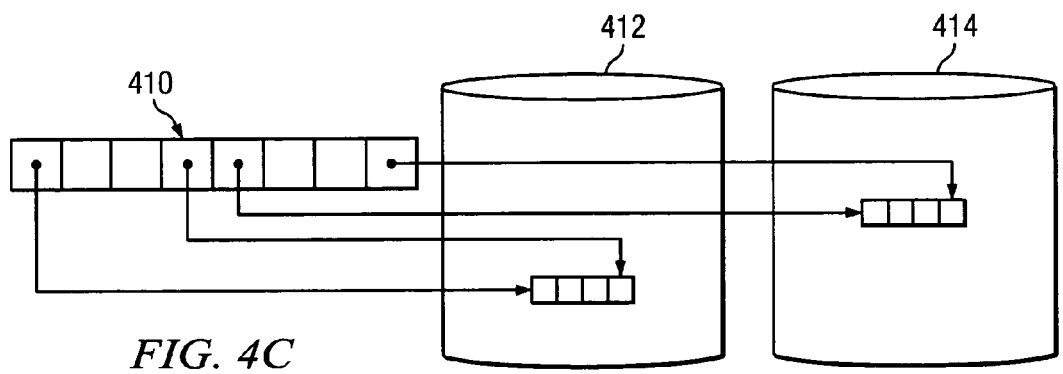
Figure 4D:
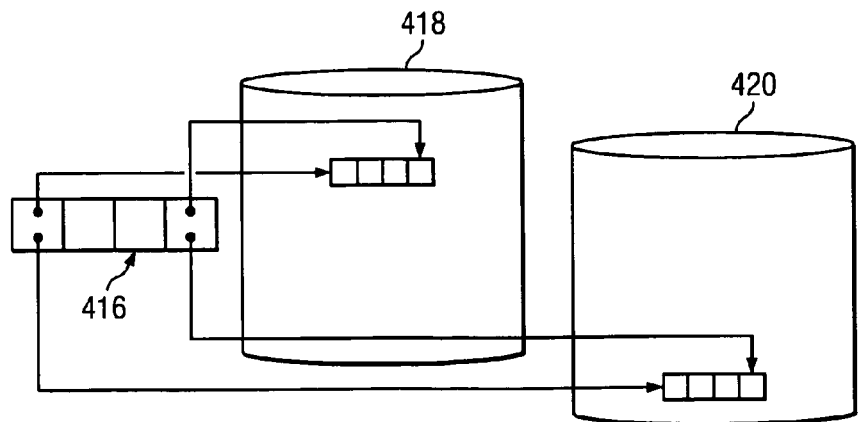

As shown in FIG. 4C, the physical storage may also span multiple physical volumes such that mapping from logical volume 410 may be to a subset of blocks located in different physical volumes 412 and 414. Redundancy may also be provided as shown in FIG. 4D where blocks in logical volume 416 are identically mapped to a subset of blocks in each of two separate physical volumes 418 and 420.

FIG. 5 is a diagram that schematically illustrates a known method for shrinking a file system in a data processing system to assist in understanding exemplary embodiments of the present invention. In particular, FIG. 5 schematically illustrates file system block allocation map (also referred to as a "bitmap") 502 that shows the allocation state of each logical block in a logical volume. As shown, there are eight logical blocks in this example, and "1" represents an allocated block while "0" represents an unallocated block.

In order to shrink the file system from eight blocks to six blocks, the traditional implementation is to move the two blocks at the end of the file system, i.e., blocks represented by bits 6 and 7, toward the front of the file system. Thus as shown in bitmap 504, blocks represented by bits 2 and 3 are changed to an allocated state, while bits 6 and 7 are changed to an unallocated state. As indicated previously, these new writes can be relatively heavyweight operations.

The two unallocated bits 6 and 7 at the end of bitmap 504 are then cut off as shown by bitmap 506 and the volume manager is instructed to perform a similar operation to the corresponding logical blocks of the logical volume.

According to an exemplary embodiment of the present invention, rather than moving logical blocks from the end toward the front of a file system, it would be more efficient to mark the amount by which it is desired to shrink a file system as being "allocated" in the bitmap (so that the file system will not try to allocate it later), and then the logical volume manager is instructed to free the corresponding physical storage. In particular, FIGS. 6A and 6B are diagrams that schematically illustrate a method for shrinking a file system in a data processing system according to an exemplary embodiment of the present invention. In FIG. 6A, logical blocks 2 and 3 of logical volume 604, represented by bits 2 and 3 in bitmap 602 (corresponding to bitmap 502 in FIG. 5) are to be removed to shrink the file system, and, accordingly are designated as being allocated. As a result, corresponding physical blocks 606*a* and 606*b* in physical volume 606 are now freed up as shown in FIG. 6A.

The file system will also keep track of the "hole" that is now present in logical volume 604 as a result of the removal of blocks 2 and 3. As shown in FIG. 6B, this is accomplished by maintaining a "hole extent" record 608 indicating the block at which the hole starts (block 2) and the block at which the hole ends (block 3). This will enable FSCK (file system check) to properly handle the hole when repairing the file system, and other utilities such as enabling DF (disk free) to ignore the "missing" space when reporting statistics. Simple extent-based metadata is sufficient to do this.

The logical volume manager will also need to keep similar metadata in its persistent control structures in order to track the hole. For example, if the LVM receives an I/O request from the hole, it will return an error.

An important advantage of the present invention is that no user data is required to be moved and no change is required to existing file metadata (although some additional/new file system metadata is required).

Figure 7:
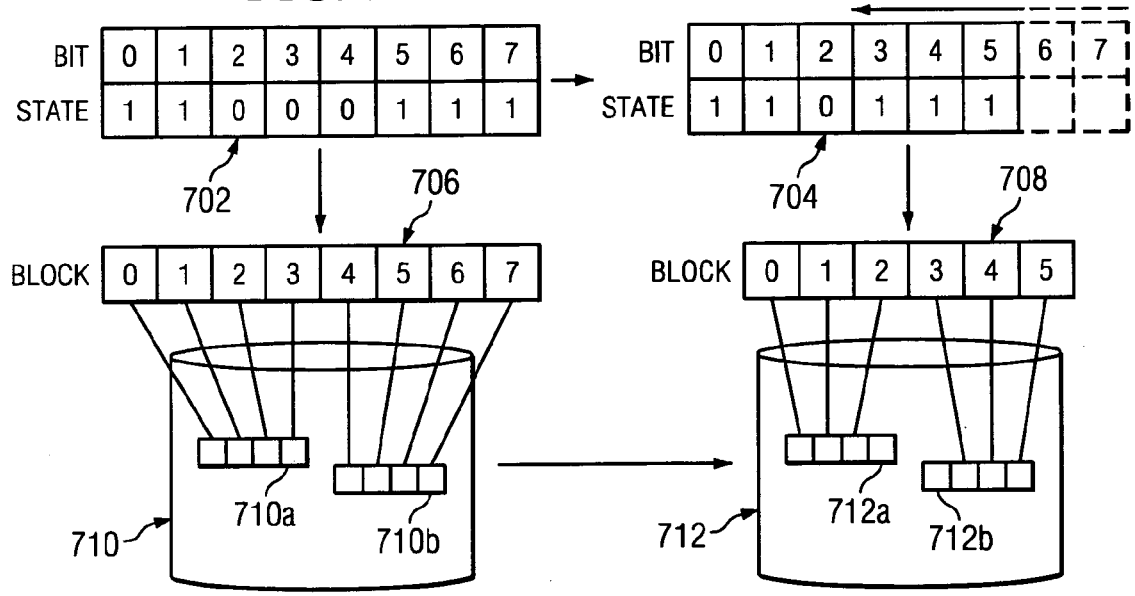
FIG. 7 is a diagram that schematically illustrates a method for shrinking a file system in a data processing system according to a further exemplary embodiment of the present invention.

FIG. 7 is a diagram that schematically illustrates a method for shrinking a file system in a data processing system according to a further exemplary embodiment of the present invention. In this exemplary embodiment, user data is "moved" by punching a hole in the logical volume, and then adjusting the metadata to create the effect of shifting user data to fill the hole.

FIG. 7 illustrates an example of the method in which logical volume 706 is to be shrunk by two blocks. In particular, logical blocks 3 and 4 in logical volume 706 are punched out, resulting in logical volume 708 having just six blocks. Bitmap 702 is then adjusted to create the effect of bits 6 and 7 having been shifted toward the front of the file system as shown by bitmap 704, and the logical volume manager performs appropriate steps to free up the corresponding physical blocks 710*a* and 710*b* in physical volume 710 to result in physical volume 712 having free physical blocks 712*a* and 712*b*.

Although the procedure illustrated in FIG. 7 does require some amount of input/output for the new metadata, it is potentially much less than actually moving the data. Also, the procedure provides an advantage of not requiring additional metadata to track the hole.

Figure 8A:
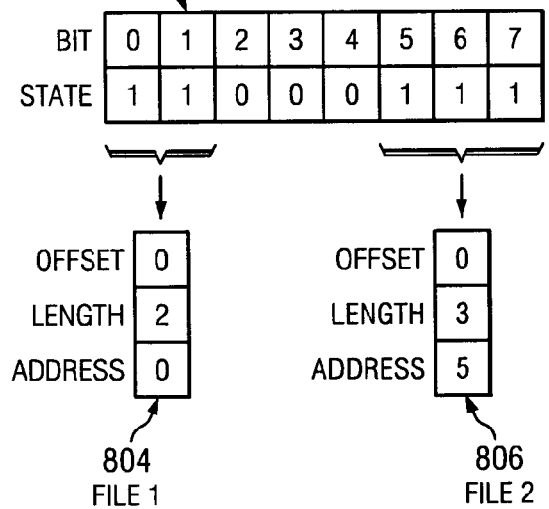
FIGS. 8A and 8B are diagrams that schematically illustrate how file metadata contains a mapping from file offset to logical volume address in the method for shrinking a file system illustrated in FIG. 7.
Figure 8B:
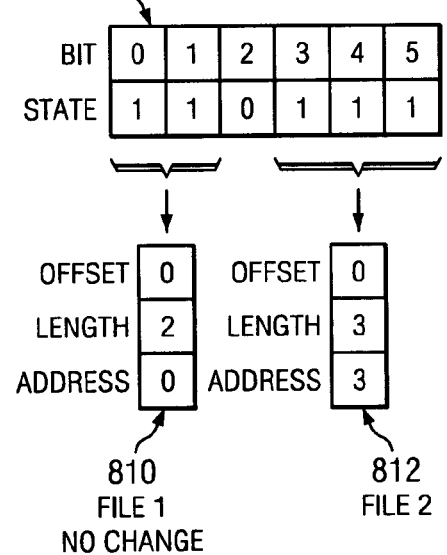

FIGS. 8A and 8B are diagrams that schematically illustrate how file metadata contains a mapping from file offset to logical volume address in the method for shrinking a file system illustrated in FIG. 7. In particular, the file metadata contains a mapping from file offset to logical volume address that is efficiently represented by an "extent". When a hole is punched beginning at block number 3 in a logical volume represented beginning at bit number 3 in bitmap 802 in FIG. 8A for a length of 2 blocks, this means that any file metadata pointing to logical block number 5 or greater must be reduced by 2. Thus, the extent for file 1 804 in FIG. 8A, which refers to blocks all before logical volume block number 3 will be unchanged as indicated by file 1 810 with respect to bitmap 808 in FIG. 8B. The extent for file 2 806, on the other hand, must be adjusted to show that the blocks to which it maps are reduced by 2 as shown by file 2 812 in FIG. 8B.

FIG. 9 is a flowchart that illustrates a method for shrinking a file system in a data processing system according to an exemplary embodiment of the present invention. The method is generally designated by reference number 900, and begins by designating a file system comprised of a plurality of contiguous blocks to be shrunk (Step 902), and then designating the amount by which the file system is to be shrunk (Step 904). At least one contiguous intermediate block of the plurality of contiguous blocks is then removed from the file system to shrink the file system by the designated amount (Step 906). As described above, the at least one contiguous intermediate block can be removed by designating it as being allocated, or by punching it out of the file system and adjusting metadata to create the effect of having shifted at least one block.

The present invention thus provides a computer implemented method, system and computer program product for shrinking a file system in a data processing system. A computer implemented method for shrinking a file system in a data processing system includes designating an amount by which a file system comprised of a plurality of contiguous blocks is to be shrunk, and removing at least one contiguous intermediate block of the plurality of contiguous blocks from the file system to shrink the file system by the designated amount.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for shrinking a file system in a data processing system, comprising:
   designating an amount by which the file system stored in a memory and comprised of a plurality of contiguous logical blocks is to be shrunk;
   removing at least one contiguous intermediate logical block of the plurality of contiguous logical blocks from the file system to shrink the file system by the designated amount; and
   maintaining a record indicating a first intermediate logical block of the at least one contiguous intermediate logical block at which the removing starts, and a last intermediate logical block of the at least one contiguous intermediate logical block at which the removing ends.

2. The method according to claim 1, wherein the file system comprises a logical volume comprised of the plurality of contiguous logical blocks.

3. The method according to claim 2, wherein removing the at least one contiguous intermediate logical block of the plurality of contiguous logical blocks from the file system to shrink the file system by the designated amount comprises:
   designating the at least one contiguous intermediate logical block as being allocated.

4. The method according to claim 3, wherein designating the at least one contiguous intermediate logical block as being allocated comprises:
   designating the at least one contiguous intermediate logical block as being allocated in metadata associated with the logical volume.

5. The method according to claim 4, wherein designating the at least one contiguous intermediate logical block as being allocated in metadata associated with the logical volume comprises:
   designating the at least one contiguous intermediate logical block as being allocated in a bitmap representing the logical volume.

6. The method according to claim 2, wherein removing the at least one contiguous intermediate logical block of the plurality of contiguous logical blocks from the file system to shrink the file system by the designated amount comprises:
   forming a hole in the logical volume at a location of the at least one contiguous intermediate logical block being removed; and
   adjusting metadata associated with the logical volume to create an effect of having shifted at least one contiguous logical block at an end of the logical volume.

7. The method according to claim 6, wherein adjusting metadata associated with the logical volume to create an effect of having shifted the at least one contiguous logical block at the end of the logical volume comprises:
   reducing metadata pointing to any logical block greater than the hole in the logical volume by an amount equal to the at least one contiguous intermediate logical block to free up physical blocks of an associated physical volume.

8. The method according to claim 2, wherein the logical volume maps to at least one physical volume.

* * * * *